Devoe & McMillan,
Wood Auger.
N° 67,785.   Patented Aug. 13, 1867.
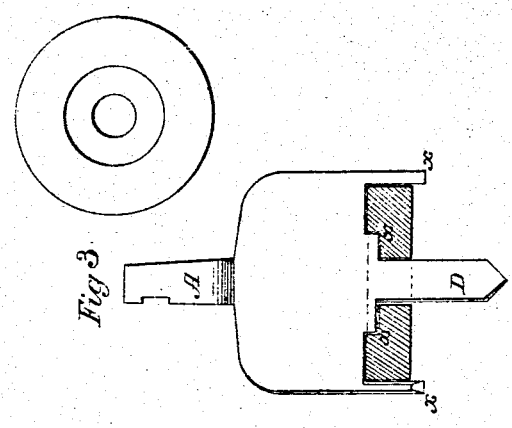

United States Patent Office.

WILLIAM H. McMILLAN AND STEPHEN DEVOE, OF NEW YORK, N. Y.

Letters Patent No. 67,785, dated August 13, 1867.

IMPROVEMENT IN CENTRE-BITS.

The Schedule referred to in these Letters Patent and making part of the same.

TO ALL WHOM IT MAY CONCERN:

Be it known that we, S. DEVOE and W. H. McMILLAN, of the city, county, and State of New York, have invented a new and improved Tool; and we do hereby declare that the following is a full, clear, and exact description thereof, which will enable others skilled in the art to make and use the same, reference being had to the accompanying drawings, forming a part of this specification.

The present invention relates to a tool, or centre-bit, or drill, more especially intended for the turning or boring out of "dead-eyes," bull-eyes, leading-trucks, and similar parts employed in the manufacture of ships' sails, and used about the rigging of ships, and for the rounding of the sheaves, and boring out the seat for the bushings thereto. In the accompanying plate of drawings our improved tool is illustrated—

Figures 1, 2, and 3, being side views of our improved tool, but showing different forms of the same, and Figures 4, 5, and 6, views of the boring ends of the tools or centre-bits, shown in side elevation respectively in figs. 1, 2, and 3.

Similar letters of reference indicate corresponding parts.

A, in the drawings, represents the shank or stem to the tool or centre-bit, made of suitable shape at one end to be secured in any socket or holder adapted to receive it, but, at its other end, of the shape to produce or cut out the desired article, such as, for instance, a "dead-eye" from a block of wood of the requisite size. The cutting edge B of the tool, shown in fig. 1, is such as to cut from a solid block of wood, by subjecting both sides of the same to its action, a block, shown by red lines in said figure, with rounded edges; the tool cutting from its centre to its extreme outer ends in both directions, and having a suitable centre-point, C, for centring it upon the block. In fig. 2 a tool is shown as provided with a centre-cutter or edge, D, with the cutting-edge of the tool from such centre cutting edge of a similar concave shape upon each side of the same, and extending outward to its extreme ends. A tool with the cutting edge, shown in fig. 2, being such as to produce or to cut out from a solid block a "dead-eye," so called. In fig. 3 a tool is shown with a similar centre cutter to that shown in fig. 2, but with a portion upon each side of such centre-cutter made with a cutting edge, which cutting edge extends from $x\,x$ on each side.

Having thus described my invention, I claim as new, and desire to secure by Letters Patent—

A centre-bit or tool constructed and provided with a cutting edge, substantially as and for the purpose described.

WM. H. McMILLAN,
STEPHEN DEVOE.

Witnesses:
WM. F. McNAMARA,
ALEX. F. ROBERTS.